March 22, 1938.　　　R. F. HALL　　　2,112,154
AIRPLANE
Filed Aug. 2, 1935　　　5 Sheets-Sheet 1

Inventor
Randolph F. Hall
By
Attorney

March 22, 1938.  R. F. HALL  2,112,154
AIRPLANE
Filed Aug. 2, 1935  5 Sheets-Sheet 5

Patented Mar. 22, 1938

2,112,154

UNITED STATES PATENT OFFICE 2,112,154

AIRPLANE

Randolph F. Hall, Rochester, N. Y.

Application August 2, 1935, Serial No. 34,451

16 Claims. (Cl. 244—42)

This invention relates to certain improvements in airplanes; and the nature and objects of the invention will be readily recognized and understood by those skilled in the aeronautical art in the light of the following explanation and detailed description of the accompanying drawings illustrating what I at present believe to be the preferred embodiments or mechanical and aerodynamic expressions of my invention from among various other forms, arrangements, combinations and constructions of which the invention is capable within the broad and generic spirit and scope thereof.

Among the several well-known types or forms of the so-called high or variable lift wings or supporting surfaces, for aircraft, are the flap types in which a movable flap portion or member is utilized to change the contour or airfoil section of a wing and thereby vary the lift capacity of the wing. Of the flap types of variable or high lift wings, the "split" form is quite generally in use and embodies a design of wing in which the flap portion is located at or in the under surface of the wing near the wing trailing edge. As a result of research, construction and actual flight tests, I have demonstrated and established the fact that a passageway in the "split" type of high lift wing, having the passage inlet or entrance usually at the under side of the wing, for displacement of air through the wing above the flap when lowered, will improve performance characteristics over those of this type of wing without the passageway. Such improved performance characteristics include a gain in lift, especially for the flap with small angular setting, and also avoids the critical condition at the stall and reducing the spin hazard, and also a beneficial influence on factors affecting stability and balance.

With the "Hall" type of high or variable lift flap type wing, there is provided an air displacement passageway through the wing having its entrance or inlet in the lower surface of the wing a short distance aft of the wing leading edge with its exit or discharge above the flap for displacement of air above and rearwardly across the flap when lowered. The flow of air through the passageway is controlled by the position of a front vane at the passageway entrance, which vane is usually of the free floating type, while the rear flap portion of the wing is operated either automatically or mechanically under the control of the pilot. This form or type of wing may also include an aileron or lateral control surface mounted above the rear flap portion of the wing, and it is found that with such mounting of aileron or control surface, the flow of air through the passageway also contributes to increased efficiency in the control operation of such a control surface.

The passageway types of high or variable lift wings, such as the "Hall" type above referred to, present certain structural problems due to the forward opening of the passageway through the under surface or skin of a wing, and these problems are intensified for wing designs of the all-metal stressed skin types of construction. Further problems and difficulties are also encountered in the design, efficient operation and useful application of such types of wings, especially when of the automatically operating flap forms, due to the tendency toward structural and mechanical complication of the control systems required for operation of the flaps.

My present invention is directed generally to the practical solution of the foregoing and certain related problems and difficulties in the design and construction of the passageway types of high or variable lift wings, and in the control systems for the wing flaps thereof; and the invention aims to make available the all-metal stressed skin types of construction for such wings, as well as to provide for the simplification of the flap operating control systems to increase efficiency of operation and reduce the structural and mechanical difficulties heretofore encountered with such control systems.

A particular object of the invention is to provide designs of stressed skin construction for high lift wings of the type having an air displacement passageway therethrough with an air entrance through a surface or skin of the wing, which designs enable the use of stressed skin construction for internally braced cantilever high lift wings of the passageway types, as well as a stressed skin construction having spaced air openings in the under skin, in which there is provided strength and rigidity to compensate for the skin openings.

A further object of the invention is to provide a design for a wing having a longitudinal passageway therethrough with a spanwise opening or openings in the lower side or skin of the wing, in which design provision is made for inherent torsional rigidity of the wing.

Another object of the invention is to provide a simplified form and arrangement of front vane for controlling the flow of air into the entrance opening of an air displacement passageway of a high or variable lift wing.

A further main object of the invention is to provide a simplified design and arrangement of control system for the opposite flaps of a flap type high lift wing by which the flaps are maintained in positive relationship and friction is reduced to a minimum in operation; and further to provide such a system of a design and arrangement that is particularly adapted to and effective for automatic flap operation.

Another object is to provide in such a flap control system for raising or lowering the flaps; and in such a system for automatic flap operation, to also provide for holding the flaps raised or for limiting the degree of operation, and for instantly releasing the flaps from a held position for immediate automatic operation thereof.

It is a further object of the invention to provide in a flap control system, for a positive control over and setting of a flap under normal flight condition but to allow the flap to raise under a predetermined load condition encountered in abnormal flight, such as in certain maneuvers or as the result of gusts.

Another object of my invention is to provide a control by which the initial force applied to the control system for an automatically operating flap of a high lift type of wing, can be readily controlled and adjusted; and further to provide such a control in the form of a compact unit for mounting in the cockpit or other desired control point on the airplane provided with such wing.

With the foregoing general objects and results in view, as well as certain others that will be readily apparent from the following description, my invention consists in certain novel and useful features in design, and in construction and combination of parts and elements, all as will be more fully and particularly referred to and specified hereinafter.

Referring to the accompanying drawings:—

Fig. 16 is a view in top plan of the central flap connecting and dihedral compensating unit forming the continuous flap arrangement of Fig. 10, and showing the coupling of the sections forming the unit with the arrangement of springs for maintaining the unit sections taut.

Figure 1:
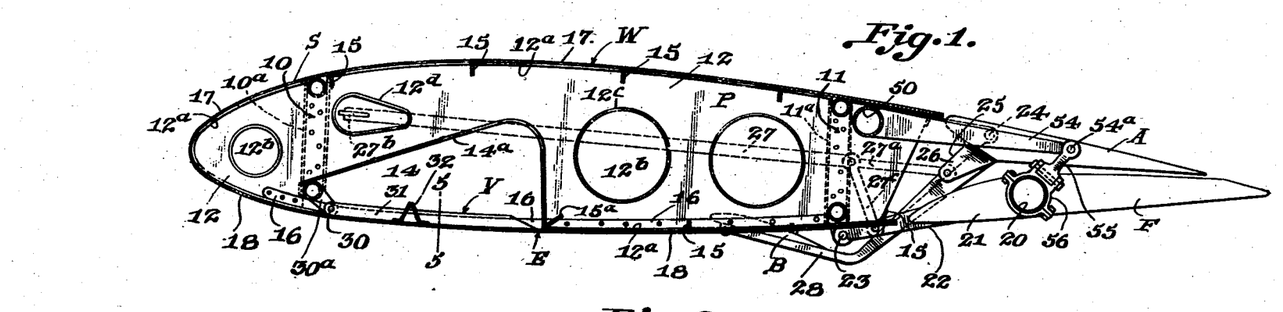
Fig. 1 is a vertical transverse section, more or less diagrammatic, through a wing of the passageway flap type of all-metal stressed skin construction of my invention and showing a portion of the flap operating control system; the flap and passageway entrance controlling vane being shown in normal positions.
Figure 2:
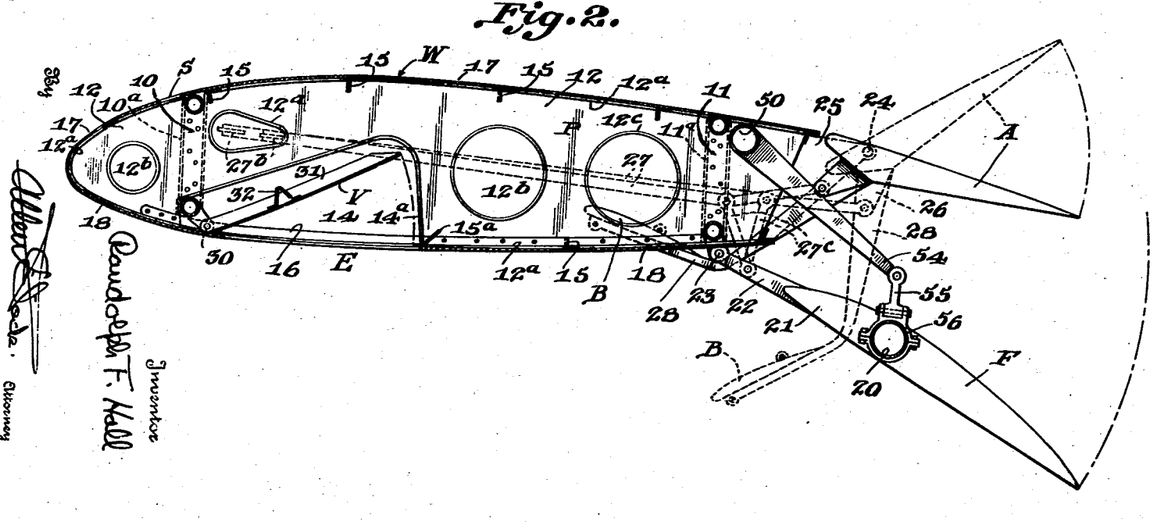
Fig. 2 is a view similar to Fig. 1 but showing the wing in high attack angle, low speed condition, with the flap lowered and the front vane in passage opening position, the aileron and balance being shown by dotted lines in lateral control position.

An embodiment of the all-metal, stressed skin type of wing construction by which the structural problems attending the design of a variable or high lift wing of the passageway type may be overcome in accordance with the teachings of my present invention, is illustrated in Figs. 1 and 2 of the drawings, as applied to and providing a wing design of the "Hall" type in which the wing passageway has its entrance through the lower skin or side of the wing adjacent the wing leading edge. In the "Hall" type of wing as shown in Figs. 1 and 2 of the drawings, the wing W includes the air displacement passageway P therethrough provided with the spanwise entrance or inlet opening or slot E through the lower surface or skin of the wing adjacent but spaced a slight distance aft of the wing leading edge. The passageway entrance E is opened and closed by a freely floating vertically swingable front vane V, shown in entrance closing position in Fig. 1 and in entrance opening position in Fig. 2. A trailing under flap F is provided and mounted on the wing for vertical swinging between normal raised position of Fig. 1, and lowered position of Fig. 2 with the passageway P discharging or displacing air rearwardly over the lowered flap F. The design of wing W also includes the aileron or lateral control surface A vertically swingably mounted on the wing in position above the under trailing flap F.

The operation, functioning and results of the "Hall" type of wing of Figs. 1 and 2 are familiar in the art. The operation of the wing flap F may be either automatic in accordance with flight conditions, or manual under the arbitrary control of a pilot. With the wing in high speed and low attack angle flight, the flap F is raised to the full line position of Fig. 1 and carries out the normal or high speed contour of the wing, while the passage inlet vane V is closed and rearward air displacement through passageway P is substantially cut off and stopped. In the low speed or high attack angle flight condition and to increase wing lift capacity, the wing flap F is lowered to the position shown in Fig. 2, opening the rear or trailing end of passage P and increasing wing under surface camber, the forward vane V being opened for rearward flow of air through wing passage P and above the lowered wing flap F.

The design of all-metal, stressed skin construction of the example of Figs. 1 and 2, adapted to a high lift wing design, such as wing W of the "Hall" type having the under surface or lower skin passage entrance E, may include the forward or front metal beam 10, and the metal rear beam truss 11 disposed longitudinally of and extending spanwise through the wing. A series of transverse flanged metal rib forming partitions 12 extend chordwise of the wing from the leading edge thereof, in this instance, to the rear beam truss 11. Each rib partition 12 is attached to the front beam 10 and to the rear beam 11, through the vertical channel members 10a and 11a, respectively, which are riveted to a side of the rib partition and fixed at their upper and lower ends to the upper and lower longitudinals of the wing beam trusses 10 and 11. Thus, the channel members 10a and 11a form the vertical members of the wing beams 10 and 11, and together with diagonal members (not shown) between the beam upper and lower longitudinals, and the beam longitudinals, form the front and rear beam trusses 10 and 11 of the wing W.

The rib partitions 12 are each provided with the flanges 12a along the upper and lower edges and around the leading edge portion thereof, while each partition extends through the rear wing beam 11 as a part of the truss thereof, and a distance to the rear of such beam 11. Each rib forming partition 12 is formed with the weight reducing holes or openings 12b, circular in the present example, having the flanges 12c therearound to stiffen and strengthen the rib, so as to form in effect a rib of the truss type. Also each rib in the forward portion thereof extending upwardly through the lower edge of the rib is provided with a cut-away portion forming an upwardly extending opening 14 therein to receive the front vane V of the passage P when this vane is swung upwardly to open position. The vane receiving openings 14 in the rib partitions 12 are each of a width substantially co-extensive with the width of passage entrance E, and each rib opening is formed with the stiffening flange 14a therealong.

A series of spanwise, angle section, stringers 15 are secured across the upper and lower flanged edges 12a of the rib partitions 12, and are spaced apart chordwise of the wing. The vertical web or flange of each angle stringer 15 is slotted or cut out at the points of intersection with the ribs, while the rib flanges are indented locally to receive the horizontal web or rib of the angle stringers. If desired the stringers can be secured and attached to the ribs by angle plates (not shown) for strength. The stringers 15 are preferably secured and attached to the rib partitions 12 by riveting them to the rib flanges 12a, as will be readily understood.

In order to prevent weakening of the rib partitions 12 by the openings 14 formed therein for vane V, an extruded inverted T-section member 16 is riveted along the lower edge of each rib partition 12 from the nose or leading edge portion of a rib in advance of the front wing beam 10, to the rear beam 11, and thus reinforces and strengthens the lower flange of each rib. The reinforcing T-sections 16 may be suitably indented locally to receive the lower stringers 15, and each of the members 16 extends across and bridges the passageway entrance or inlet opening E for a co-operative function with the vane V, as will be hereinafter referred to. Preferably, the spanwise stringer 15a along and at the rear of the openings 14 in the rib partitions 12, is provided of larger size than the remaining stringers 15, in order to obtain added strength at and between such points on the rib partitions.

The wing W includes the upper metal skin or covering 17 and the lower metal skin or covering 18 extending over and across the rib partitions 12 and stringers 15 and around the forward ends of the ribs to form the nose or leading edge portion of the wing. The metal skin 17—18 is riveted to the upper and lower edge flanges 12a of the rib partitions 12 and to the upper and lower stringers 15—15a, to form therewith a rigid structure.

The trailing under surface wing flap F extends along the span of the wing and in the example hereof is of more or less conventional construction to include the tubular longitudinal or spanwise beam 20 and metal leading edge section 21 for torsional rigidity and strength to prevent deflection of the outer span portion of the flap when the flap is held in lowered position by a flap control system that is coupled to the flap beam 20 near the inner end of the flap. The pivotal mounting for the flap F on wing W is carried out by a remote hinge arm or arms 22 fixed to the flap and pivoted underneath the rear beam at the pivot or pivots 23. By this mounting a space is provided between flap F when lowered and the underside of the wing as disclosed and explained in my U. S. Patent 1,841,804 dated January 19, 1932.

The aileron A of wing W is mounted in and as a part of the trailing upper surface of wing W and is mounted for vertical swinging on pivot or pivots 24 carried by the aileron hinge or hinges 25. The aileron A is provided with the control horn or crank 26 extending forwardly and downwardly therefrom and crank 26 is pivotally coupled to the push-pull tube 27 of the aileron control system by the link 27a. The push-pull tube 27 extends forwardly through the wing to a forward crank 27b, and the wing rib partitions 12 may be provided with the flanged holes or openings 12d for receiving and through which members of the aileron control system may extend.

A link 27c is pivotally connected between and couples a flap hinge arm 22 with the aileron control push-pull tube 27 at the axis of the connection of this tube with aileron link 27a. Thus, lowering of flap F moves aileron crank 26 forwardly to simultaneously lower aileron A, as will be clear from Figs. 1 and 2 of the drawings. This arrangement carries out certain features of my Patent 1,922,157—February 19, 1935.

The aileron A is also preferably provided with a balance member B mounted on spaced forwardly extending arms 28 carried by the aileron, with the balance B located spaced forwardly from the aileron near the wing lower surface 18. The wing lower surface or skin 18 is provided with an opening to receive balance member B when in raised position with aileron A in neutral position as shown in Fig. 1. The balance member B is adjustably mounted on arms 28, and these arms are shaped so as to clear the rear beam 11 of the wing with the balance in raised position. Suitable slots or openings are provided in flap F for the aileron balance arms 28 for operating clearance. The operation and functions of the aileron balance member B are fully set forth in my U. S. Patent 1,992,158, dated February 19, 1935, and my pending U. S. patent application Serial No. 16,707, filed April 16, 1935, now U. S. Patent 2,045,463 dated June 23, 1936, and need not be here repeated.

The wing W may, if desired, be provided with the span-wise extending slot S through the upper skin 17 of the wing just forward of the front wing beam 10 and between rib partitions 12. Such a slot S is in communication with the passageway P through the wing and provides for outward circulation of air from the slot to the upper boundary layer of air over the wing, which is beneficial to performance and lateral control.

Figures 3, 4, 5, 6, 7, 8:
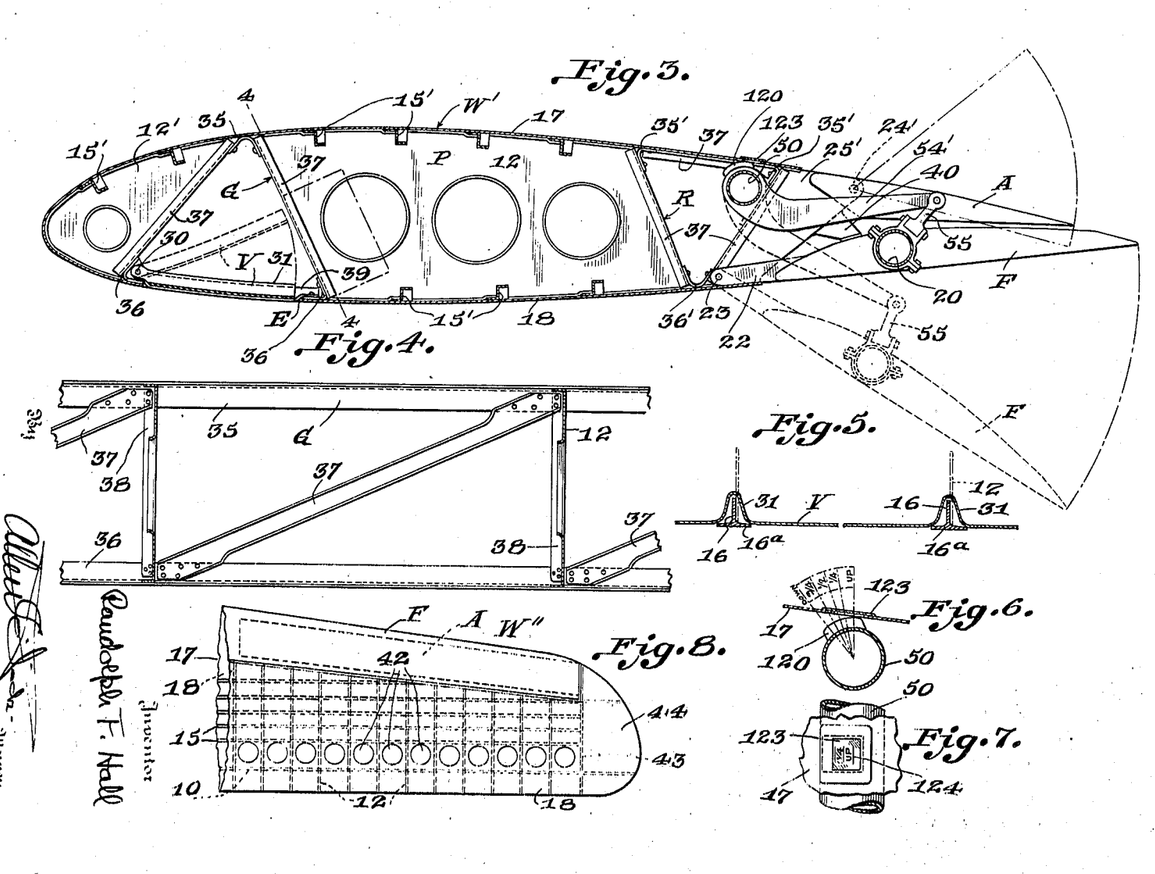
Fig. 3 is a vertical transverse section, more or less diagrammatic, through a construction of internally braced, stressed skin wing of the passageway flap type of my invention, with the torque shaft and crank of the flap control system also shown; the flap and front vane being shown in lowered passage opening positions by dotted lines.
Fig. 4 is a detail sectional view taken as on the line 4—4 of Fig. 3, showing a portion of the forward triangular wing beam or girder in rear elevation, and showing the wing ribs in section and the rib attachment to the beam in elevation.
Fig. 5 is a detail vertical transverse section through a portion of the front vane of the wings of Figs. 1 to 3, with the vane in lowered position closing the passage entrance.
Fig. 6 is a vertical section through the flap operating torque shaft and portion of the wing upper skin, showing the arrangement and mounting of the flap position indicator and sight opening therefor.
Fig. 7 is a detail top plan of the portion of the wing upper skin and flap torque tube showing the flap position indicator dial visible through the sight opening in the wing skin.
Fig. 8 is a view in bottom plan, more or less diagrammatic, of a modified form of internally braced, stressed skin high lift wing showing spaced wing openings in the lower skin for air entrance to the wing passageway.

The front vane V of wing W controlling the passage of air through the lower skin entrance or inlet E is mounted hinged near its leading edge to the pivot 30 carried by a hinge member or members 30a supported from the lower longitudinal of front wing beam 10, and extends rearwardly over and across the passage entrance E. The vane preferably terminates at its trailing edge spaced a slight distance forwardly from the rear edge of entrance E so as to leave a narrow opening or slot into passageway P even when vane V is in lowered, passage closing position of Fig. 1. As vane V extends over and across the T-section members 16 which bridge entrance E and connect the forward and rear sections of rib partitions 12 across openings 14, the vane V which is preferably formed of sheet metal, is provided with the ribs 31 spaced apart spanwise thereof to provide grooves for receiving and fitting down over the vertical flanges of the T-section members 16 when the vane is in lowered position. Referring now to Fig. 5 in particular, the ribs 31 provide grooves having a width at the lower sides substantially the width of the horizontal flanges 16a, of the members 16, so that with the vane in lowered position, these flanges 16a close the grooves and present a substantially unbroken surface at the under side of the vane. As the vane in lowered passage entrance closing position forms a portion of the normal wing under surface, this construction and arrangement eliminates breaks and interruptions in the normal, high speed contour of the wing. In order to reinforce vane V, a flanged and inverted V-section member 32 is riveted spanwise across the vane, being cut-out to fit over ribs 31, and provides torsional stiffness for the vane. The front vane V is pivotally mounted for vertical swinging in wing W within the openings 14 of the rib partitions 12, between lowered passage closing position of Fig. 1, and raised passage opening position of Fig. 2. While the vane is preferably freely floating, it may if desired be connected to flap F to function as a balance member for the flap, as will be readily recognized.

With the construction of wing W of Figs. 1 and 2, an all-metal, stressed skin design is provided for a passageway type wing, and for the relative beam proportions indicated by the drawings, some external bracing for the wing is contemplated, although it is to be understood that the beam sizes can be increased, if desired, to eliminate the necessity for external bracing. In the wing construction shown, the reinforced upper and lower metal skin 17 and 18 takes only a small part of the bending stress from the lift loads but would ordinarily eliminate the need for internal brace wires as their load is distributed between the upper and lower metal wing skin. In order to increase the strength of the lower metal skin 18, the stringer 15a directly to the rear of the passageway entrance or inlet opening E through the lower skin, is formed of sufficient strength to transfer an axial component resulting from the chord forces to local points where the load can be taken into the front wing beam 10. To save weight for the wing and to reduce flutter tendencies, the aileron A and the flap F of the wing, may, if desired, be covered with fabric instead of metal as in the case of the stressed structure of the wing.

A design of wing W' of the high lift, longitudinal passageway "Hall" type such as wing W of Figs. 1 and 2, is illustrated in Fig. 3, as formed by the application of the stressed skin, all-metal construction to provide an internally braced, cantilever form of such type of wing. The wing W' has the spanwise forward passage entrance or inlet opening E through the lower or under metal skin 18, which opening is controlled by the vane V, but in order to compensate for this opening E in the lower skin of the wing, a novel truss arrangement is provided to resist stresses due to lift and chord loads, with a high degree of torsional rigidity. Such truss arrangement embodies a triangular girder G forming the front or forward truss of the wing and comprising the upper longitudinal 35, spaced lower longitudinals 36 with diagonals 37 in the sloping up-right forward and rear sides of the girder, as well as verticals 38 formed by the forward flanged ends of the rib partitions 12 and 12' of the wing. The lower side of front truss girder G is provided only with the spaced cross members 39 extending between the lower, spaced girder longitudinals 36. The lower skin 18 of the wing is open along and between the spaced lower longitudinals 36 of the girder so that the passage inlet E is located at and formed by the open lower side of the girder with the cross members 39 bridging the opening E.

The vane V is hinged at its leading edge by pivot 30 carried by the forward lower girder longitudinal 36, and is provided with the ribs 31 forming grooves in the lower side of the vane for fitting over and receiving members 39 when the vane is in the lowered full line position of Fig. 3. In raised inlet E opening position vane V swings upwardly into truss girder G as shown by dotted lines in Fig. 3.

An inverted triangular truss girder R, generally similar to front girder G, is provided extending spanwise through the rear of the wing and includes the spaced upper longitudinals 35' and the lower girder longitudinal 36', connected by the diagonals 37 with the verticals formed by the end edge flanges of the rib partitions 12 at the forward side of the truss girder. Diagonals 37 are also provided between and connecting the upper spaced longitudinals 35'. The longitudinals 35—36 and 35'—36' of the triangular truss girders G and R are preferably of angle section, as will be clear from Fig. 3, and are proportioned to sustain loads due to function in the truss.

The spaced rib partitions 12 in the wing W' of Fig. 3 extend between the front girder G and rear girder R and have their front and rear end edges flanged and riveted to the girder longitudinals to provide the girder verticals 38 for the girders as clearly shown by Fig. 4 of the drawings illustrating such arrangement for the rear side of girder G. In this instance, separate leading edge rib sections 12' are employed which have their rear vertical edges flanged and riveted to the upper longitudinal 35 and the forward lower longitudinal 36 of girder G, to form the verticals similar to 38 of Fig. 4, for the forward sloping side of the triangular girder.

The rib partitions 12 and 12' have their upper and lower edges cut out at spaced intervals to receive the relatively closely spaced Z-section stringers 15' extending across and riveted to the upper flanged edges of rib partitions 12 and 12', and the lower or under flanged edges of rib partitions 12 only, in this instance. The flanges of the rib partitions are suitably locally indented to receive the flanges of Z-section stringers 15' as indicated in Fig. 3. The upper and lower metal skin 17 and 18 is riveted to and along the flanged edges of rib partitions 12 and 12' chordwise of the wing, and to and along the outer flanges of the upper and lower stringers 15' spanwise of the wing, as well as being riveted to the upper and lower longitudinals of the triangular truss girders G and R, so as to form therewith a reinforced stressed skin capable of resisting bending stresses on the wing while the sloping sides of the girders carry the shear forces.

The wing W' includes the flap F and aileron A generally mounted as described in connection with wing W of Figs. 1 and 2. The hinge arms 22 of flap F swingably mount the flap from the pivot 23, which pivot in this instance is carried by the rear triangular girder R of the wing. Aileron hinges are supported on and extend rearwardly from girder R on which aileron A is mounted for vertical swinging on pivot axis 24'. The aileron hinges 25' include and carry the stops 40 at certain points along the span of the flap F for engagement by the flap to determine the maximum up-position thereof and to thereby transfer excessive raised flap forces directly to the wing structure. Suitable aileron control mechanism, such for example as indicated for the aileron A of wing W of Figs. 1 and 2 is of course provided for aileron A of Fig. 3, and if desired an aileron balance B as shown for wing W may also be provided for the aileron A of wing W', as will be readily understood.

It is here pointed out that in place of the triangular rear girder R of wing W' of Fig. 3, a single beam truss can be employed; while in place of the triangular front girder G it is possible to employ as an equivalent, a single vertical or moderately sloping truss positioned directly aft or to the rear of a forwardly located passage inlet and front vane, so that the front and rear beam trusses would be directly connected by the upper and lower reinforced skin 17 and 18 to form, in effect, a box section resisting bending as an internally braced cantilever wing and affording the required torsional rigidity.

Figures 9, 10:
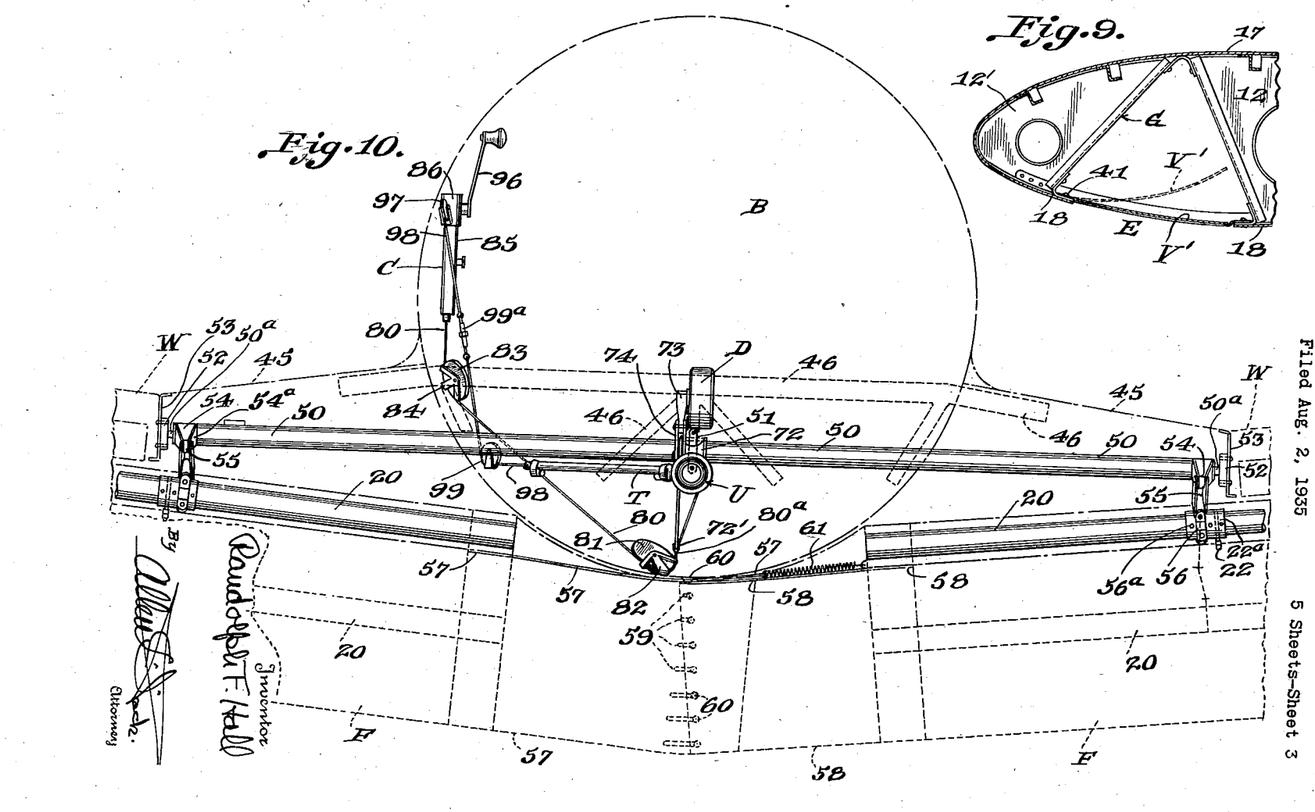
Fig. 9 is a vertical transverse section through the forward portion of a wing of the type of Fig. 3, showing a thin flexible sheet material form of front vane for the entrance to the wing passageway mounted in the triangular wing girder.
Fig. 10 is a view in rear elevation of the automatic flap operating torque shaft and cockpit control system showing the operative connection with the opposite flap beams, and also showing the central flap connecting unit, the flaps and connecting unit being indicated in lowered position by dotted lines, while portions of the airplane body and wings are indicated by broken lines.

In Fig. 9 of the drawings, I have shown a modified form of front vane V' controlling the inlet opening of a wing passageway, such form of vane being shown merely as an example as applied to a design of wing W' of Fig. 3. The vane V' is formed of a thin resilient or springlike metal sheet which is riveted at 41 along its front or leading edge forward of passageway entrance or inlet opening E in the lower skin 18, and in normal position extends rearwardly across and substantially closes this entrance, as shown by full lines in Fig. 9. So constructed and mounted, vane V' can be sprung, flexed or bent upwardly to the passage opening position shown by dotted lines in Fig. 9, and upon removal of the upwardly acting flexing force thereon, will spring downwardly back to normal passage closing position. Thus, in operation of wing W', vane V' is forced or flexed upwardly by air pressure conditions established by lowering the flap F, and springs back to normal closed position when such pressure conditions are removed, as by raising flap F. The vane V' can be formed as a single member extending for the span of the passageway inlet opening, or as a series of separate vane members each disposed between adjacent rib partitions of a wing, which in the case of the design of wing W of Fig. 1 will permit elimination of the rib partition cut-outs 14, as well as the elimination of the lower reinforcing members 16, if desired, although such members 16 may be retained and used as lower stops for engagement by the vane edges.

In the design of passageway wing W'' shown more or less diagrammatically in bottom plan in Fig. 8 of the drawings, the wing is of the internally braced type of tapered form, and is illustrative of a construction by which strength and rigidity is obtained for a wing having the air displacement passageway located to the rear of the front beam of the wing, represented as at 10. The continuous lower or under skin 18 of this stressed skin wing is provided with a series of spaced holes or openings 42 along the span of the wing, and in the particular example here shown each located between adjacent rib partitions 12 of the wing. The holes or openings 42 thus form the entrance or inlet openings through which air enters into the passageway through the wing. The usual front vane or vanes of the type of vane V or of V', or any other desired type of vane, may be utilized for normally opening and closing air inlet holes 42, either automatically or manually or the holes may be left open. If desired the holes or openings 42 may be made of smaller area and formed in a plurality of rows in the stressed skin of the wing. The stressed skin through which these air inlet holes are formed is preferably reinforced and strengthened by using heavier gage material, or by reinforcing plates riveted thereto, near such holes 42, in order to compensate for any weakness due to such holes or openings. Obviously, the metal skin or equivalent covering of the wing may be varied in strength over and along the wing to efficiently and economically carry and distribute the stresses to which subjected.

The wing W'' includes the sealing rib partition 43 at the outer end or side of the passageway through the wing, similar to passageway P of wing W to prevent air from the passageway entering the wing tip unit 44. This wing tip unit may be constructed separately from the wing and, if desired, may be covered with fabric to save weight as the metal covering for strength is unnecessary at the wing tip. Such passageway end sealing rib and separate wing tip unit may be utilized of course with designs of wings W and W', as well as other designs of passageway wings where applicable.

My invention presents as a major contribution and a feature thereof, a simplified and efficient operating control system for the wing flaps of a high lift wing, such as the flaps F of the high lift wings of the "Hall" type herein disclosed and described, and in the illustrated example, such a system is shown as applied to opposite wings of the type referred to of a low wing monoplane, although of course the control system is in no sense limited to such an application thereof, as will be referred to hereinafter. Utilizing high lift wings of the design of wing W of Figs. 1 and 2, a low wing type monoplane is diagrammatically illustrated in part by Fig. 10 of the drawings, in which the body or fuselage B of the airplane is indicated by dot and dash outline, with the opposite low monoplane wings W, a portion only of which are shown in outline, extending from the wing stubs 45 at opposite lower sides of fuselage B. Portions of the body and wing truss members 46 are diagrammatically indicated in dotted outline extending across body B and into the opposite wing stubs 45.

The opposite wings W are mounted on the body wing stubs 45, with dihedral, and in this instance, the flaps F of wings W extend inwardly on the under side of the wing stubs to the adjacent sides of body B, but are not continuous under and across the body due to the dihedral of the wings, although in accordance with another feature of my invention to be later described, a substantial continuous flap effect is obtained by a connecting unit between the flap ends. The tubular spanwise beam 20 of each wing flap F extends inwardly with the flap to the adjacent side of body B, as will be clear by reference to Fig. 10 of the drawings.

The flap operating control system of the invention in the illustrative example thereof here presented includes and is based upon a continuous torque tube shaft member 50 mounted in fuselage B transversely thereof and extending outwardly through the opposite wing stubs 45 to the outer ends of such wing stubs, to positively connect and form a common rigid operating member coupling the opposite wing flaps F. Referring to Fig. 10 of the drawings, such shaft 50 is supported at its intermediate portion in the central bearing 51 carried by the fuselage truss structure 46 within the fuselage B, and is supported at its opposite ends by the extension shafts 50a in the bearings 52 carried by the rib or bracket members 53 in the ends of the wing stubs 45. The central bearing 51 and opposite end bearings 52 are of the ball or anti-friction type for minimum friction in the operating system. The torque shaft 50 is thus rotatably mounted in bearings 51 and 52, and extends outwardly through wing stubs 45 in a plane above the inner end lengths of wing flaps F and in a position spaced forward of the flaps and the flap beams 20. The shaft 50 has a position in this particular example, adjacent but to the rear of the planes of the rear wing beams 11 of the wings W, as indicated by Figs. 1 and 2 of the drawings.

The torque shaft 50 is provided with the opposite end cranks 54 that extend rearwardly therefrom and each of these end cranks is operatively coupled to the beam 20 of the adjacent wing flap F by a link 55, which is pivotally connected to the rear end of its crank 54 by a self-aligning ball bearing 54a (see Fig. 1). Each crank 54 extends above the flap beam 20 of the adjacent flap F and the flap beam 20 is provided with a ball bearing universal 56 concentric with and rotatable on the beam, and positioned thereon between a fixed base 22a for a flap hinge arm 22 and a collar 56a fixed to beam 20. (See Fig. 10.) The links 55 are coupled pivotally at their lower ends to the universals 56, respectively, on the beams 20 of opposite wing flaps F.

As the axis of torque shaft 50 and the axis of each flap F are slightly divergent, due to the wing dihedral, the link 55 connecting the shaft with a flap does not operate in the same plane and is connected to a crank 54 by the self-aligning ball bearing 54a and to the flap beam by the ball bearing universal coupling 56 to care for this condition. Thus, with torque shaft 50 so mounted and coupled to the opposite flaps, rotation of the shaft causes simultaneous, positive and equal swinging of the opposite flaps F to raise or lower; and raising or lowering of the flaps F by forces applied thereto rotates shaft 50 and because of its positive coupling with the opposite flaps results in balanced and equal flap movements. The slope of a link 55 will create a small force acting along the flap F to which it is coupled, in some positions of the link, as will be evident from the rear view of Fig. 10, but the remote hinges 22—23 for the flaps are designed to transmit such forces directly to the wing structure. The opposite links 55 may be slightly varied in length to correct lateral balance or to modify the initial flap setting.

The opposite wing flaps F proper, are not extended under the fuselage F to form a continuous flap because of the dihedral of opposite wings W, but in order to provide the aerodynamic characteristics of a single or continuous flap, I have devised a metal panel or unit referring now to Figs. 10 and 16 of the drawings, which comprises the overlapping sections 57 and 58 secured to the inner ends of the opposite flaps, F, respectively, and extending between and joining the flaps as continuations thereof. With reference to Fig. 10, the left-hand panel section 57 is of the width or chord of left-hand flap F and is secured to the inner end of the flap and extends inwardly a distance over and across the right-hand flap section 58, which latter section is secured to the inner end of right-hand flap F and is also of the width or chord of such flap. The inner overlapped ends of the panel sections 57 and 58 are connected together for relative and limited sliding one on the other, by an arrangement of spaced parallel slots 59 formed in the section 57 and which increase in length spanwise of the section from leading to trailing edge thereof, and a series of grooved button or the like members 60 fixed to section 58 and slidably received in slots 59, respectively, to connect these overlapping sections. A plurality of coil springs 61 are connected between the end of section 57 and the inner end of the opposite flap F which carries section 58, for the purpose of maintaining the sections taut and in proper overlapped relation in operation and use.

With the continuous flap forming unit 57—58 connecting the opposite flaps F, when these flaps are in their normal raised position, the sections 57—58 of the unit are in the position of Fig. 16 and the full line position of Fig. 10, in which the studs or buttons 60 of section 58 are at the outer ends of slots 59 in a straight line, chordwise of the unit. As the flaps F swing downwardly due to the dihedral of wings W the overlapped inner ends of sections 57—58 slide outwardly over each other as the sections move downwardly and this outward movement or sliding increases along the chord of the sections from the leading edge to the trailing edge thereof until the maximum distance is reached at the trailing edge. Thus, the grooved studs or button members 60 move in the slots 59 to the opposite ends of the slots as shown by the dotted line lowered positions of flaps F and sections 57 and 58 in Fig. 10, and the continuous flap forming unit is unbroken across and between the flaps F as the sliding overlapped and connected sections 57 and 58 compensate and allow for the dihedral angle of the opposite wings as the flaps F are raised and lowered.

The wings W of the "Hall" high lift, passageway-flap type as applied for the low wing monoplane design of Fig. 10, are in this particular example automatic in operation, and in accordance with a further important feature of my present invention, an initial force means is incorporated in the flap control system for applying initial lowering forces to the opposite wing flaps F.

Figure 11:
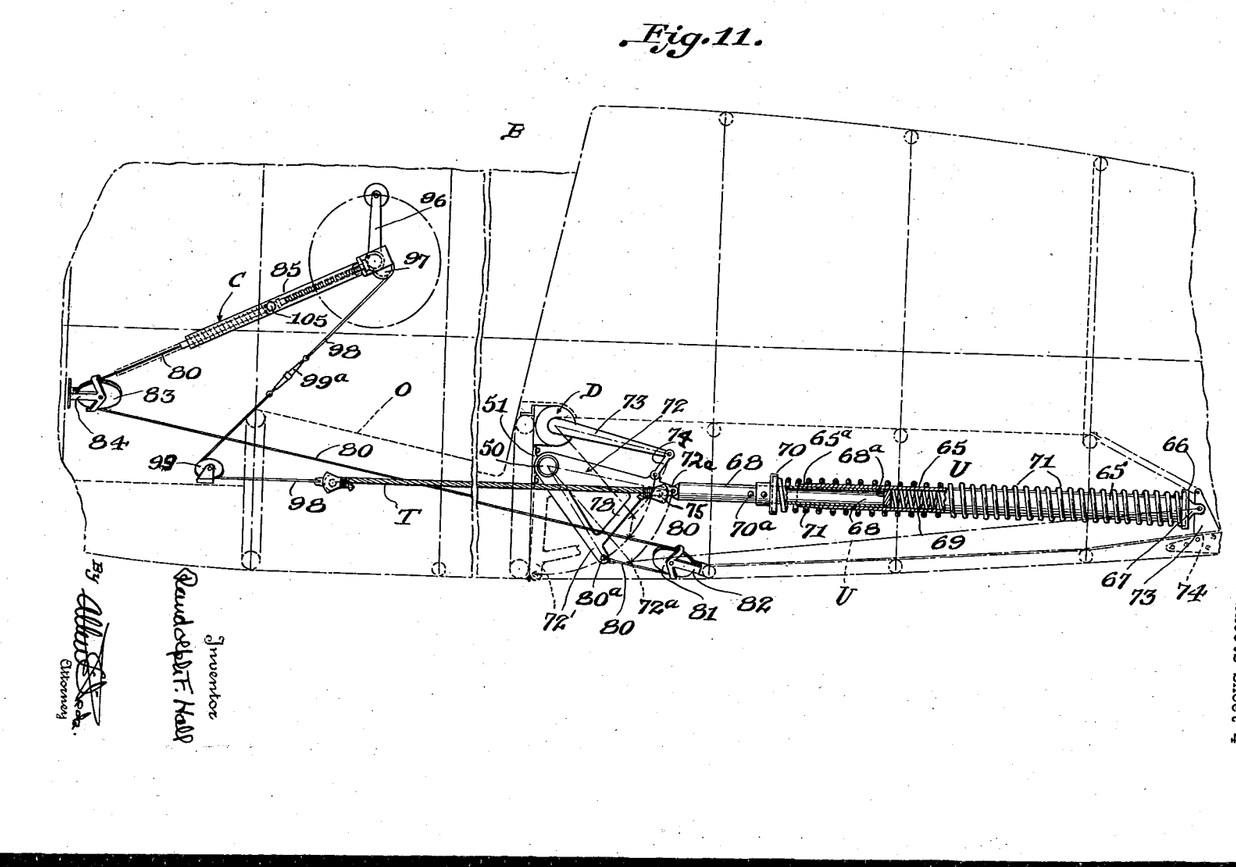
Fig. 11 is a view in side elevation of the automatic flap control system, including the cockpit control, initial force unit and force varying unit, portions of the airplane body being indicated in outline by dot and dash lines.

Such means, referring now to Fig. 11 of the drawings, may preferably take the form of a compression spring unit U that includes an outer cylinder 65 having at one end a head 66 provided with the exterior forked member 67 for pivotally attaching such end of the unit to a mounting structure. A plunger shaft 68 telescopes into the open forward end of tube 65 opposite the head end 66, and this shaft is provided at its inner end with a piston forming plug or head 68a. An initial force compression spring 69 is mounted within and occupies the cylinder 65 between the end head 66 and the inner headed end 68a of plunger shaft 68. A cup forming collar 70 is bolted to the plunger shaft 68 adjacent the end of cylinder 65 and an external compression spring 71 is mounted on the outer cylinder 65 between the cup member 70 which receives one end of the spring, and the head 66 at the opposite end of the cylinder 65, which receives the opposite end of the spring. The adjustment of the initial force exerted by exterior spring 71 is possible by adjusting the position of collar 70 on plunger 68 relative to the cylinder 65, and a series of bolt holes 70a are provided through shaft 68 for this purpose. Of course, if desired, the shaft 68 can be externally threaded and receive an adjusting nut (not shown) for adjusting the position of collar 70 on the shaft. Preferably, the end of cylinder 65 that receives shaft 68 is externally tapered at 65a to eliminate interference with the external compression spring 71 in the operation of the unit U.

The initial force unit U is mounted to apply forces to the flap control system at the flap control torque shaft 50 within the airplane fuselage B, and in the example hereof, referring to Figs. 10 and 11, of the drawings, the shaft 50 is provided with a crank 72 fixed thereon adjacent the central bearing 51 of the shaft which crank extends rearwardly from the shaft. The control unit U is mounted by pivotally connecting the fork member 67 at its rear end to a fitting or bracket member 73 which is attached, as by riveting, to the lower stringer 74 of the fuselage B which may be of the reinforced stressed skin construction. The force unit U so attached at the rear extends forwardly through the body B and has the forward end of its plunger shaft 68 pivotally bolted to the upper arm of shaft 50 carried crank 72 at the pivot 72a. With the crank 72 in position with torque shaft 50 for the raised position of the wing flaps F, as shown by Fig. 11, the springs 69 and 71 of the unit U are under compression and continuously exerting an initial force on the crank to rotate shaft 50 and lower the wing flaps F which are coupled to the shaft by cranks 54 and links 55. Under conditions permitting the initial force unit U to lower flaps F, the crank 72 is swung downwardly to a vertically disposed position in which pivot 72a is in the position indicated and the unit U axis lies along the dot-dash line shown in Fig. 11 by the reference letter U.

In order to prevent too rapid or quick movements of the flap control system, I may provide a hydraulic dash-pot type of damping unit D mounted in position on the fuselage or body structure above crank 72 on shaft 50. The damping unit D includes the rearwardly extended crank arm 73 which is pivotally coupled with the rear end of crank 72 by the link 74. Unit D thus serves to dampen the movements of the flap control system and the raising and lowering movements of the opposite wing flaps F connected therewith. In addition to the damping of the control system movements by unit D, the initial force unit U also functions to pneumatically dampen movements of the system as the result of pressure change within cylinder 65 as plunger shaft 68 reciprocates therein. The damping unit D may even be eliminated, if desired, by providing proper air seals for plunger shaft 68 in cylinder 65, such for example, as piston rings, leather washers or the like.

In addition to the initial force unit U, I have in the flap control system here disclosed, provided an auxiliary force unit T applying flap lowering forces to the flap control system through crank 72 on the torque shaft 50. Unit T may take the form of a tension shock absorber cord, or an equivalent tension spring unit, and is attached at one end to the crank 72 at 75, adjacent the pivotal connection 72a of unit U to the crank. This force unit T extends horizontally and forwardly from crank 72 in approximately the horizontal plane of the axis of unit U, to a point adjacent a side of body or fuselage B (see Fig. 10) where it is normally fixed and held under tension to apply initial lowering force to crank 72.

Automatically operating flaps for proper and efficient functioning thereof, require that the flap air hinge moment under a desired flight condition and for a given flap setting be balanced by the initial flap moment applied to the flap. In order that the flap will raise as high speed, low angle of attack of the wing approaches, the initial force moment applied must be relatively low, while on the contrary for the flap to lower at low speed, high angle of attack flight, the initial force moment applied to the flap must be relatively high. With the arrangement of the automatically operating opposite flaps F and the flap control system therefor, including the initial force unit U and the unit T, it will be noted that when crank 72 is in the raised flap position shown by full lines in Fig. 11, the initial force leverage is low and the resulting moment tending to rotate the shaft 50 and lower flaps F is therefore relatively low. When the flaps F are lowered, however, and shaft 50 has been rotated to swing crank 72 down to the position in which pivot 72a is in the position indicated by the dotted lead line, the initial force unit acts with much greater leverage and the moment opposing rotation of the shaft 50 for raising of flaps F is relatively high. The exact length of the initial force unit U depends of course upon various factors but such length will be sufficient to prevent excessive reduction in the force applied by the unit when the flaps lower and the unit expands or is extended.

Attention is here directed to the fact that the invention with the several features thereof hereinbefore explained and others to be later described, is not limited or confined in its application to any particular type of aircraft or wing arrangement, combination or location. Both the torque shaft 50 of the flap control system and/or the initial force unit may be installed in a wing instead of in the body of an airplane, as for instance in the case of a high wing type of airplane, or for a low wing type, if desired. For instance, the low wing arrangement of Fig. 10 hereof may be taken to represent a one-piece cantilever low wing of the continuous type in which the torque shaft and/or force unit of the flap control system can be installed. The torque shaft, such as shaft 50 of the control system, can be used in a flap control system having separate flap initial force units, in which case the torque shaft will serve as a positive connection between opposite flaps to insure balanced operation with or without the additional function of providing means for control of the system from the cockpit or other control point of the airplane. Obviously, the length and mounting of the continuous torque shaft of a system depends upon design conditions. For instance, increased shaft length can be provided for several flap operating points along the span, or length of the shaft can be reduced to the extreme at which the shaft forms and serves solely as a crank unit bearing for operating a continuous, or in effect continuous flap from a single point. In addition to the torque shaft control system shown, separate means (not shown) can be provided to insure parallel action of the wing flap along its span in the event the flap alone did not possess sufficient torque rigidity. For example, the outer and inner portions of the flap can be connected for parallel motion with the mechanism disclosed in Fig. 1 of my U. S. Patent 1,959,236 dated May 15, 1934; it being understood of course, that the initial force and cockpit control of such Fig. 1 of the patent would be replaced by the flap control system of my present invention.

The control system for automatic operation of the flaps, including as described the torque shaft 50 and initial force units U and T, may, if desired, also embody and provide for holding a flap or flaps raised; limiting the degree or extent of the automatic flap operation; and for instant release of the flap or flaps and control system from any position, for full automatic operation.

In carrying out such provisions and features of the invention in accordance with the particular examples here shown, a control and operating unit C, referring to Figs. 10 and 11 of the drawings, is mounted and installed at a suitable control point, such as the cockpit of the body or fuselage B of the airplane. The control unit C provides the means, for holding the flaps F raised, limiting the degree of operation thereof, and for instant release of the flaps from any held position, and is operatively coupled with the flap control system through the medium of the cable 80 connecting the unit with the torque shaft crank 72. This crank 72 in the form here shown includes a lower arm 72' braced by a segment 78 between such arm and the upper arm of the crank (see Fig. 11), and this lower crank arm 72' swings through an arc between the position thereof with crank 72 in the full line position for raised flap position, to the position shown by dotted lines in Fig. 11 for the crank in flap lowered position. However, the change in leverage conforms to the relative change in the initial force moment, but without excessive leverage change such as would cause play in the system or create too high a force in the control cable 80.

In the particular installation and arrangement shown, the cable 80 is attached at 80a to the rear end of lower arm 72' of crank 72 and extends rearward to and over pulley 81 which is pivotally mounted on the body structure by a combined cable guard and support 82. From pulley 81, the cable 80 extends forwardly through the body B to the pulley 83 mounted to the body structure forward of unit C, by a combined cable guard and support 84. Cable 80 extends around pulley 83 and rearwardly and upwardly therefrom to the forward or lower end of the cockpit control unit C. Obviously, a system of push-pull tubes and bell cranks may be employed in place and as the equivalent of the cable 80 and pulleys 81 and 83, and the invention is in no sense limited to the cable type of operating system here shown.

A possible construction and arrangement of such a cockpit control unit C of the system here shown as an example, is illustrated in detail in Figs. 12 to 15, inclusive, of the drawings, and includes the square tubular and elongated main casing or housing 85 having at one end the enlarged head forming housing 86. A shaft 87 is mounted for rotation in the housing or casing 85 in an end bearing 88 at the upper or head end of the casing, and a bearing 89 fixed in the casing 85 at a point intermediate the length of the casing. the shaft 87 having the reduced inner or lower end 87a received in the bearing 89. Shaft 87 is externally threaded between the bearings 88 and 89, throughout its length and a trunnion nut 90 is threaded on the shaft. The trunnion nut 90 has the opposite studs 91 extending therefrom which are slidably received and confined in slots 92 disposed longitudinally of casing 85 and between the upper and lower shaft bearings 88 and 89. The upper or outer face of the trunnion nut 90 and the inner face of the enlarged end of shaft 87 in bearing 88 are toothed as indicated at 90a in Fig. 12, so that such end of the shaft forms a positive stop engaged by the nut when in maximum raised position on the shaft.

The upper end of shaft 87 within housing head 86, has the pinion 93 fixed thereon and operatively in mesh with a bevel gear 94 keyed to a shaft 95 journaled in a suitable bearing in a side wall of the housing 86. The outer end of shaft 95 has the knobbed operating crank handle 96 fixed thereon for rotating the shaft and through the meshed gears 93 and 94, to rotate the screw shaft 87 and raise and lower trunnion nut 90, which nut is held against rotation by the studs 91 in the casing slots 92.

Within housing head 86 adjacent the side wall thereof opposite gear 94, a pulley 97 is mounted for rotation on an axis disposed transversely of the axis of screw shaft 87. A cable 98 is secured by a cable eye 98a to the extended end of one of the trunnion nut studs 91 (see Fig. 14) with a nut 98b cottered on the end of such stud to maintain the cable eye against displacement; a suitable washer or the like being mounted on the stud between nut 98b and the cable eye 98a. Cable 98 extends inwardly through housing head 86, over pulley 97 and downwardly and forwardly through body B, referring now to Figs. 10 and 11, to a pulley 99 mounted in the body. From pulley 99 cable 98 extends to and is connected with the forward end of the tension cord force unit T. A turnbuckle 99a is inserted in cable 98 intermediate pulleys 97 and 99, all for a purpose appearing hereinafter.

Figures 12, 13, 14, 15:
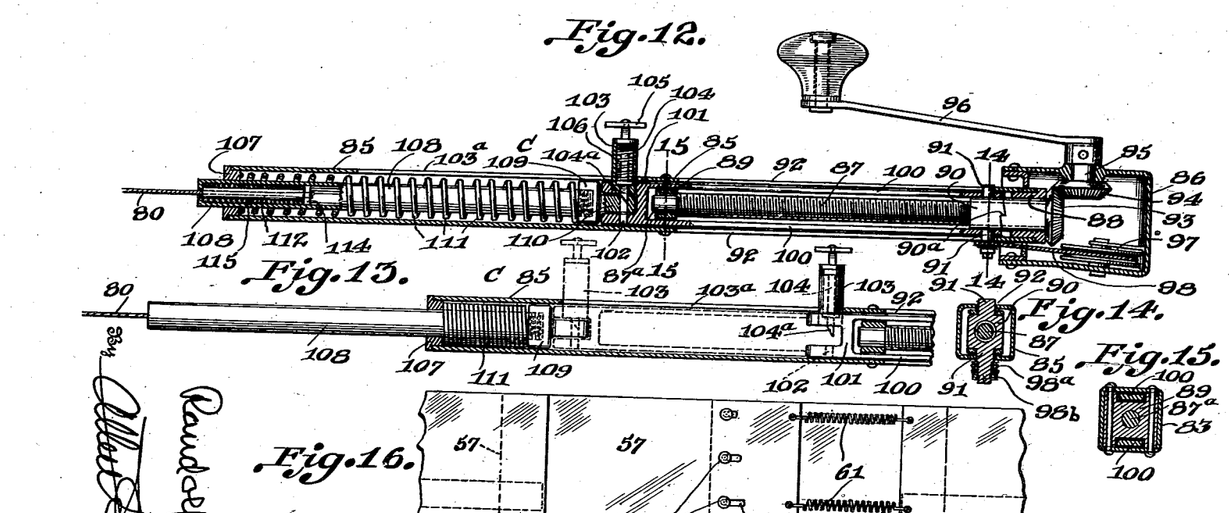
Fig. 12 is a longitudinal sectional view of the cockpit control unit mechanism.
Fig. 13 is a view partly in longitudinal section of the lower portion of the unit of Fig. 12, with the mechanism shown in full lines in position after instant release for automatic flap operation, and in dotted lines in position for reattachment and manual flap raising.
Fig. 14 is a transverse section through the cockpit control unit taken on line 14—14, of Fig. 12.
Fig. 15 is a transverse section taken on line 15—15, of Fig. 12.

Within the casing 85 of the unit C the trunnion nut 90 carries a link unit that includes the links 100 attached at their outer ends to the studs 91 and extending inwardly along and between the screw shaft 87 and opposite sides of the casing 85, to and through slots or grooves formed in the shaft bearing 89 at opposite sides of the shaft (see Fig. 15 in particular). At their inner or lower ends the links 100 are connected with the jaw member 101, which member is formed with a transverse bore 102 through one of the jaws thereof. The jaw of member 101 opposite the jaw with bore 102, is provided with a lateral and outwardly projecting hollow boss 103, alined with jaw bore 102, and housing a shaft 104, held against rotation, having a head or button 105 at its outer end. The plunger shaft 104 extends inwardly through the jaw member into the space between the jaws thereof and is beveled at its inner end to form a latch 104a. A coiled expansion spring 106 is confined in boss 103 around and exerting pressure on shaft 104 to normally maintain the shaft with latch 104a in position extended into the space between the jaws of member 101, as shown by Figs. 12 and 13. The boss 103 projects outwardly through a slot 103a in the adjacent side wall of casing 85, and this slot extends a considerable distance inwardly or downwardly through the wall to permit free sliding movement therealong of boss 103, as the jaw member is lowered and raised in the casing.

The lower end of casing 85 of unit C is provided with a head 107 having an axial bore therethrough, and a tubular shaft 108 is extended through this head bore for reciprocation therein axially of the casing. Shaft 108 extends upwardly and axially into the lower end section of casing 85 and is provided at its inner end with a squared head 109 having the tongue 110 extending axially therefrom adapted to fit into the jaw member 101 between the opposite jaws thereof. The tongue 110 is formed with a transverse bore therethrough for alinement with and to receive the latch 104a formed by shaft 104 of the jaw member. A coil compression spring 111 is mounted around tubular shaft 108, between the casing head 107, and the head 109 at the inner end of the shaft. Spring 111 continuously exerts a force acting on head 109 tending to move the shaft inwardly, that is, upwardly, into casing 85.

A plug 112 is loosely mounted at the lower end of tubular shaft 108, within the shaft, for movement axially thereof, and this plug is provided at its inner end with a shoulder forming head 114, referring to Fig. 12. A coil spring 115 is confined between the outer closed end of shaft 108 and the head 114, the spring being mounted over and around the plug. The end of the control cable 80 is secured in and to plug 112, with the cable extending slidably through an axial opening or bore in the end of tube shaft 108, so that the spring 115 acts continuously to move plug 112 inwardly and draw cable 80 up into the shaft. In normal position spring 115 is substantially completely compressed and any slack in cable 80 is thus taken up by the action of the spring to draw the cable into the shaft.

The cockpit control unit C is mounted in forwardly and downwardly inclined position in the cockpit of body B with the handle 96 at the upper end thereof, as well as the instant release button 105, in position readily accessible to an occupant of the cockpit in the seat as indicated by dotted lines at O in Fig. 11, and with the unit operatively coupled by cables 80 and 98 to the torque shaft crank 72. With control unit C in position holding the flaps F in raised position against movement, the handle 96 has been rotated to raise trunnion nut 90 to its maximum raised position (see Figs. 11 and 12), and to raise tube 108 connected with nut 90 by links 100 and the jaw member 101 coupled to tube tongue 110 by the spring pressed latch 104a, to positively hold crank 72 against down swinging by the cable 80 connected between tube 108 and the lower arm 72' of the crank. With the flap control in this flap raised and held position, in order to instantly release the flaps for automatic operation, the release button 105 of the control unit C is pulled outwardly to withdraw latch 104a from engagement with end tongue 110 of tube 108. This releases tube 108 and its head 109 from the jaw member 101, so that tube 108 and cable 80 attached thereto free the crank 72 and the flap control system and flaps F can automatically lower under flap lowering flight conditions and the action of initial force unit U and T.

After release of the control system for automatic flap operation and with the flaps in lowered position, as the airplane approaches low angle of attack—high speed flight, say for instance, following a stall, the flaps F automatically raise and crank 72 is swung upwardly to raise the lower crank arm 72' to the full line position of Fig. 11, which allows the cable 80 to the cockpit control to slacken. This slack in cable 80 is taken up by the initially compressed spring 111 acting on tube 108 to force this tube inwardly and draw up cable 80. The tube 108 is forced inwardly by spring 111 back into position to reengage tongue 110 with the jaw member 101. As the tongue moves into the jaw member, the beveled latch 104a is forced outwardly and then snaps into the bore of tongue 110 to automatically lock the jaw member to the tongue and hold tube 108 and the flap control system in position securing flaps F against further automatic operation until again released by operation by the instant release button 105 of the control unit C.

In place of the beveled latch 104a, I propose to use a shaft 104 that is extended inwardly a distance to pass through tongue 110 and engage the bore 102 in the opposite jaw of member 101, but it has not been deemed necessary to here show such an extension of the shaft 104. Suffice to say that with the extended form of shaft 104, when spring 111 returns tube 108 and its tongue 110 to position re-engaging jaw member 101, the operator then pulls shaft 104 outwardly to permit the tongue to move therepast until the tongue bore is alined with the shaft. The operator then releases shaft 104 which snaps into position extended through the tongue and into jaw bore 102 to lock the tube 108 and jaw member 101 together. It is to be here noted that the head 109 of tube 108, as well as the jaw member 101 are squared to thereby prevent rotation thereof in the square casing 85.

With the use of the automatic coupling by the beveled latch 104a, the necessity for the operator pulling out the instant release button 105 before re-engagement of tongue 110 and jaw member 101, as must be done with the extended form of shaft 104, is avoided. However, with the extended form of shaft 104, continuous full automatic operation of the flaps F after instant release by button 105 may take place until the manual coupling operation hereinbefore referred to, is carried out. The continuous automatic operation of the flaps after instant release by the automatic form of latch 104a, will not of course take place once the flaps have been raised after a release operation, unless, of course, the operator has reset the control unit C by the handle member 96 for continuous full automatic operation, to move the trunnion nut 90 and jaw member 101 to the full lowered position shown by dotted lines in Fig. 13, in which position the cable unit 108 is coupled to jaw member 101 and the slack in cable 80 is taken up by the spring 115 acting on cable attaching plug 112 to force this plug inwardly in tube 108.

The setting of the control unit C to determine the degree or extent of the automatic operation of the flaps F is done by rotating handle 96 to raise or lower trunnion nut 90 to the desired position to set tube 108 at the required position for such automatic operation. The setting of the control unit C can be readily visually determined by the operation from the position of a trunnion nut stud 91 in its slot 92 in casing 85. However, as a further aid in this connection, the actual position of a flap can be determined by means of an indicator arrangement illustrated in Figs. 3, 6 and 7 of the drawings.

Referring to Fig. 3, a curved, arcuate indicator dial 120 is secured in position on the upper side of one end of the torque shaft 50 within a wing, and on its upper face this dial can carry the markings as indicated in Figs. 5 and 6. An opening is formed in the wing skin 17 above and exposing the dial 40 to view therethrough. A transparent cover 123 is mounted over and closing the wing opening, and this cover may be provided with a sight line 124 for registry with the dial markings to indicate the flap position. Thus the operator by glancing over the side of the body can quickly accurately determine from the dial marking in registry with line 124, the actual position of a flap, or in the present flap control system, the actual position of the opposite flaps F from the single indicator.

The initial force unit T, in the combination in the control system of the present arrangement of such system, provides an additional auxiliary initial force control element. For instance, when the trunnion nut 90 is moved downwardly away from the pulley 97 on the unit C, and the flaps F are permitted to lower, the cable 98 attached between the trunnion nut and the unit T, is drawn forward to thereby increase the tension force in the unit T and thus increase the initial force moment acting on crank 72 tending to lower flaps F. By this arrangement a control is provided over the rate of initial force change, as well as over the change in the leverage, which reduces design problems and also provides for modifying the initial force characteristics as may be found desirable over a period of service or during and as a result of tests. Further, the turn buckle 98a, or other equivalent means in the cable 98 may be employed to adjust and vary the initial force applied by unit T, either when the airplane is on the ground or in flight.

The force in the auxiliary unit T is reduced as the flaps F are raised by the cockpit control unit C, and this force reduction to a certain extent offsets an increase in the force of the main unit U, which main unit carries less force due to the efficient contribution of force by the auxiliary unit T as the flaps lower. These conditions result in an improvement in the automatic flap control, while the force at the control unit handle 96 tends to be less, especially when raising the flap manually when the airplane is on the ground. Instead of a single handle 96 common to and operating both controls, a separate handle is contemplated and may be provided for the auxiliary initial force unit T.

The auxiliary initial force unit T can be designed, if desired, to be sufficiently stiff in action, or through adjustment of the cable take-up means in the present example can be made so stiff in action that the cockpit control C provides a practically positive manual control over the flaps during normal flight conditions. The auxiliary force unit is, however, sufficiently resilient to permit the flaps to deflect during abnormal flight conditions to avoid extreme flap hinge moments that would impair or weaken the structure or interfere seriously with the balance and stability of the airplane. This feature of the invention contemplates and includes the use of a flexible or resilient unit in an otherwise manually controlled positive flap system, where the functions obtained from it in the present example as pointed out above, will also be obtained.

The several features of the invention here disclosed are not limited to use together or in the arrangements as here shown. For instance, the stressed skin passageway wing construction is not limited to automatically operated flaps, while the longitudinal passageway in the wing is not itself essential to the automatically operated flap system of the invention. Further the main initial force unit U, is not limited to the compression coil spring type of the present example, as other forms of springs, rubber, compressed air, or combinations thereof are to be considered as the broad equivalent and may be substituted for such compression spring unit.

It is also evident that various changes, modifications, additions, eliminations, substitutions and variations might be resorted to without departing from the spirit and scope of my invention and hence, I do not wish to limit my invention in all respects to the exact and specific disclosures hereof.

What I claim, is:

1. In a high lift wing having a wing flap movable between normal and high lift positions, a system for automatically operating the wing flap, including a main initial force unit and an auxiliary initial force unit applying forces to the flap for automatic operation thereof, said auxiliary force unit providing means for changing the force applied for automatically operating the flap during flight, means for moving the flap to and holding the same in normal position against automatic operation, and a common control for said force changing means and for said means for moving and holding the flap in normal position.

2. In an airplane, opposite wings of the high lift type each having a vertically swingable wing flap, said opposite wings mounted on the airplane with dihedral angle, and a unit connecting the inner ends of said flaps to form therewith a substantially continuous flap, said unit embodying overlapping sections carried by the wing flaps, respectively, and said sections relatively movably connected to compensate for the dihedral angle of the opposite wings as the flaps are swung vertically.

3. In a high lift wing, opposite wing flaps movable to positions varying the lift capacity of the wing, a torque shaft mounted spaced from and structurally independent of said opposite flaps, means positively connecting said torque shaft with said opposite flaps whereby the flaps are maintained in fixed relationship throughout their range of movement, means associated with said torque shaft for applying forces thereto for automatic lift capacity varying movement of said flaps, said force applying means constructed and arranged for operation to change the range of automatic movement of said flaps, and additional means operable independently of the force applying means for controlling the position of the flaps.

4. In aircraft, opposite wings of the high lift type each having a vertically swingable wing flap mounted thereon, said opposite wings mounted on the aircraft with dihedral angle and the inner ends of said opposite wing flaps spaced apart, and means connecting the spaced inner ends of said flaps to form therewith a substantially continuous flap, said means embodying overlapping sections carried by the wing flaps, and said sections relatively movable to compensate for the dihedral angle of the opposite wings as the flaps are swung vertically.

5. In aircraft, opposite wings each having a vertically swingable flap member mounted thereon, said opposite wings mounted on the air craft with dihedral angle and the inner ends of said opposite flap members being spaced apart, and a connecting unit between and joining the spaced inner ends of said opposite flaps to form therewith a substantially continuous flap, the said connecting unit embodying overlapping and relatively movable sections carried by the opposite wing flaps, respectively, and yielding means coupling said sections.

6. In a high lift wing having a vertically movable wing flap for varying wing lift capacity, a control system for automatically operating the flap, including a main initial force unit, an auxiliary initial force unit, said main and auxiliary units applying operating forces to the flap for automatic operation thereof, and said auxiliary force unit constructed and arranged to apply forces of reduced magnitude to the flap as the flap is raised from a lowered position.

7. In aircraft, opposite wings of the high lift type each having a vertically swingable wing flap mounted thereon, said opposite wings mounted on the aircraft with the inner ends of the opposite flaps thereon spaced apart, means connecting the spaced inner ends of said flaps to form therewith a substantially continuous and unbroken flap surface, and said means embodying overlapping sections carried by the wing flaps respectively, with said sections relatively movable to compensate for relative movement between the flaps through their range of vertical swing.

8. In an aircraft, a body, opposite wings extending from said body and each provided with a vertically movable wing lift varying flap mounted thereon, said flaps being designed and mounted for automatic lift varying movements under the action of varying air forces acting thereon in flight, a horizontally disposed torque shaft structurally independent of and spaced from said opposite wing flaps, mechanism positively coupling said shaft with said opposite flaps whereby the latter are maintained in fixed relationship throughout their range of automatic lift varying movements, a crank on said shaft within the body, a force applying unit mounted in the body connected between a fixed point in the body and said torque shaft crank for applying a force to said shaft in a direction continuously acting to move the flaps downwardly to lift increasing positions, and an auxiliary force unit mounted within the body separately from said assembly of torque shaft, crank and first-mentioned force unit, but connected with said torque shaft crank to also exert forces thereon tending to rotate the shaft in a direction to move said flaps downwardly.

9. In combination, a wing having a wing lift capacity varying flap movable between normal raised and lowered positions, a wing flap control system for automatic operation of the flap, including releasable means for holding the flap in raised position against automatic operation, said releasable flap holding means including mechanism adapted to be actuated by movement of the flap from a lowered position to a normal raised position to reengage and again lock the flap position against automatic operation, and said releasable means also being constructed and arranged for operation to adjust the range of flap movement and selectively predetermine the maximum lowered position of the flap.

10. In a high lift wing provided with a lift varying wing flap movable between normal raised position and lowered lift increasing positions, a flap control system for automatic operation of the flap, said system including releasable means for engagement with the flap control system for holding the flap in raised position against automatic operation, means for instantly releasing said flap-holding means for full automatic operation of the flap, and said locking means including mechanism actuated by the movement of the flap and its control system from a lowered position to a normal raised position to reengage and relock the system to again hold the flap against operation.

11. In combination, a wing having a vertically movable lift capacity varying flap member designed and mounted for automatic operation by the action of varying air forces to which subjected in flight, a flap control system for automatic operation of said flap, including means continuously applying a force to the flap tending to move said flap in one vertical direction, means separate and removed from the aforesaid control system but operatively associated with said system for adjustment to change the magnitude of the force being applied by the said force means, and said force magnitude changing means being constructed and arranged for operation to also change the range of positions assumed by the flap during automatic operation thereof.

12. In a high lift wing, a lift varying wing flap automatically movable between normal position and positions increasing wing lift by the action of the varying air forces to which said flap is subjected in flight, a control system for assisting automatic operation of said wing flap, said system including a main initial force unit and an auxiliary initial force unit both continuously applying forces to the flap acting thereon in a direction tending to move the flap to lift increasing positions, and said auxiliary force unit being constructed and arranged to provide means also operable for adjustment to change the magnitude of the forces applied to the flap during flight.

13. In a high lift wing, a wing lift varying flap automatically movable between normal position and positions increasing wing lift by the action of varying air forces to which the flap is subjected in flight, a system for assisting automatic operation of the wing flap, said system including a main initial force unit constructed and arranged to continuously apply forces to the flap acting in a direction to move the flap to lift increasing positions, an auxiliary force unit removed from said flap operating system but operatively coupled therewith to also apply a force to said operating system in a direction tending to move the flap to lift increasing positions, said auxiliary force unit being also constructed and arranged to provide adjustable means for changing the forces applied to the flap by said main and auxiliary force units during flight, and means for releasably holding the flap against automatic operation.

14. In an airplane, including a high lift wing provided with a lift capacity varying wing flap automatically moved between normal position and wing lift increasing positions, a flap control system including means continuously applying a force to the flap for aiding automatic operation thereof under the action of the air forces, means removed from but operatively coupled with the flap control system for adjusting and setting said force means to change the magnitude of the force being applied to the flap by said means, and said force adjusting means also being constructed and arranged for operation to change the range of positions assumed by the flap during automatic operation of the flap in flight.

15. In a high lift wing, a wing lift varying flap automatically movable between normal position and positions increasing wing lift by the action of varying air forces to which the flap is subjected in flight, a system for assisting automatic operation of the wing flap, said system including a main initial force unit constructed and arranged to continuously apply forces to the flap acting in a direction to move the flap to lift increasing positions, an auxiliary force unit removed from said flap operating system but operatively coupled therewith to also apply a force to said operating system in a direction tending to move the flap to lift increasing positions, and said auxiliary force unit being also constructed and arranged for arbitrary manual operation to change the forces applied to the flap by said main and auxiliary force units during flight.

16. In an aircraft, a body, opposite wings extending from said body and each provided with a vertically movable wing lift varying flap mounted thereon, said flaps being designed and mounted for automatic operation to raise by the action of the air forces thereon under low angle of attack or high speed flight conditions and to lower to wing lift capacity increasing positions by the action of the air forces thereon under high angle of attack or low speed flight conditions, a horizontally disposed torque shaft structurally independent of and spaced from said opposite wing flaps, said shaft being extended transversely of the body, mechanism positively coupling said shaft with said opposite flaps whereby the latter are maintained in fixed relationship against relative movement throughout their range of automatic lift varying movements, a crank on said shaft within the body intermediate the shaft ends, a force applying unit mounted to the body at a fixed point therein spaced rearwardly from said torque shaft, said unit extending forwardly through and along the longitudinal center of the body to and operatively coupled with said torque shaft crank whereby the unit continuously applies a force to said shaft in a direction acting to move the flaps to lift increasing positions to thereby aid automatic operation of the flaps, an auxiliary force unit mounted within the body separately from said torque shaft and first-mentioned force unit, said auxiliary force unit being operatively connected to said torque shaft crank to also exert forces thereon tending to rotate the shaft in a direction to move said flaps to lift increasing positions, and manually controlled means operatively associated with said auxiliary force unit for varying the force exerted thereby on the torque shaft crank so as to change the magnitude of the force applied by said force units to the wing flaps.

RANDOLPH F. HALL.